United States Patent
Chen et al.

(10) Patent No.: US 11,511,712 B2
(45) Date of Patent: Nov. 29, 2022

(54) TRAIN COMPARTMENT BRAKE CONTROL METHOD, TRAIN COMPARTMENT, AND TRAIN

(71) Applicant: CRRC TANGSHAN CO., LTD., Hebei (CN)

(72) Inventors: Shujun Chen, Tangshan (CN); Jiaying Qin, Tangshan (CN); Zhonghua Liu, Tangshan (CN); Yingyu Zhang, Tangshan (CN); De Quan, Tangshan (CN); Chuan Ma, Tangshan (CN); Liqiang Zhu, Tangshan (CN); Qinggang Zhang, Tangshan (CN); Zhenhong Wang, Tangshan (CN); Huijie Du, Tangshan (CN); Yanxiang Liu, Tangshan (CN)

(73) Assignee: CRRC TANGSHAN CO., LTD., Hebei (CN)

( * ) Notice: Subject to any disclaimer, the term of this patent is extended or adjusted under 35 U.S.C. 154(b) by 422 days.

(21) Appl. No.: 16/627,325

(22) PCT Filed: Dec. 29, 2017

(86) PCT No.: PCT/CN2017/120286
§ 371 (c)(1),
(2) Date: Dec. 29, 2019

(87) PCT Pub. No.: WO2019/100533
PCT Pub. Date: May 31, 2019

(65) Prior Publication Data
US 2020/0164843 A1    May 28, 2020

(30) Foreign Application Priority Data
Nov. 21, 2017  (CN) .......................... 201711162652.5

(51) Int. Cl.
  *B60T 8/17*   (2006.01)
  *B60T 8/171*  (2006.01)
  (Continued)

(52) U.S. Cl.
  CPC ............ *B60T 8/1705* (2013.01); *B60T 8/171* (2013.01); *B61H 13/34* (2013.01); *H04L 12/40* (2013.01);
  (Continued)

(58) Field of Classification Search
  CPC ...... B60T 8/1705; B60T 8/171; B60T 8/3235; B60T 17/228; B60T 13/665; B60T 13/74;
  (Continued)

(56) References Cited

U.S. PATENT DOCUMENTS 5,966,084 A    10/1999  Lumbis
9,764,745 B2    9/2017  Tsuzaka
(Continued)

FOREIGN PATENT DOCUMENTS

CN    101039816 A    9/2007
CN    101541615 A    9/2009
(Continued)

OTHER PUBLICATIONS

CN 105452049 (Mar. 30, 2016) English Translation of Document Cited on 1449.*
(Continued)

*Primary Examiner* — Russell Frejd
(74) *Attorney, Agent, or Firm* — Syncoda LLC; Feng Ma

(57) ABSTRACT

A train compartment brake control method includes: acquiring the number of train compartments of a current train; acquiring the number and type of a current train compartment; and on the basis of a train brake instruction and the number of train compartments of the current train, calculating a braking force of the current train compartment, and
(Continued)

performing brake control on the current train compartment. The technical solution described in the present application is applicable to a train having any number of train compartments. The above method acquires the number of train compartments of a train in real time, calculates the braking force required by each train compartment according to the number and type of a current train compartment, and performs brake control on the train.

17 Claims, 2 Drawing Sheets

(51) Int. Cl.
*B61H 13/34* (2006.01)
*H04L 12/40* (2006.01)
*H04L 12/46* (2006.01)

(52) U.S. Cl.
CPC .... *H04L 12/46* (2013.01); *H04L 2012/40293* (2013.01)

(58) Field of Classification Search
CPC ... B60T 2270/406; B61H 13/34; H04L 12/40; H04L 12/46; H04L 2012/40293; B60L 7/24; B61L 15/0036; B61L 25/028
See application file for complete search history.

(56) References Cited

U.S. PATENT DOCUMENTS

| | | | | |
|---|---|---|---|---|
| 10,717,421 | B2* | 7/2020 | Chen | ................... B61L 3/006 |
| 2007/0067085 | A1 | 3/2007 | Lu | |
| 2014/0376554 | A1 | 12/2014 | Komura | |
| 2016/0176419 | A1 | 6/2016 | Tsuzaka | |
| 2016/0280195 | A1 | 9/2016 | Kull et al. | |
| 2016/0318533 | A1* | 11/2016 | Wiesand | ................... B61L 27/04 |
| 2018/0186351 | A1* | 7/2018 | Chen | ................... B60T 8/171 |
| 2018/0194378 | A1 | 7/2018 | Xu et al. | |

FOREIGN PATENT DOCUMENTS

| | | |
|---|---|---|
| CN | 102514601 A | 6/2012 |
| CN | 105015524 A | 11/2015 |
| CN | 105438222 A | 3/2016 |
| CN | 105452049 A | 3/2016 |
| CN | 106476846 A | 3/2017 |
| CN | 106603377 A | 4/2017 |
| CN | 107101838 A | 8/2017 |
| JP | 2001314001 A | 11/2001 |
| JP | 2011055416 A | 3/2011 |
| WO | 2017005112 A1 | 1/2017 |

OTHER PUBLICATIONS

Aar: "AAR Manual of standars and Recommened Practices—Electronically controllet Brake systems—S4200—Electronically controlled pneumatic (EPC) cable-based brake systems—performance requirements", Feb. 1, 2008 (Feb. 1, 2008), XP055677135, Retrieved from the Internet: URL: http://www.spoornet.co.za/Website/tender pdf/AAR20Spec%20S-4200.pdf [ retrieved on Mar. 17, 2020]* the whole document *.

International Search Report in the international application No. PCT/CN2017/120286, dated Aug. 15, 2018.

English translation of the Written Opinion of the International Search Authority in the international application No. PCT/CN2017/120286, dated Aug. 15, 2018.

Supplementary European Search Report in the European application No. 17933096.4, dated Mar. 31, 2020.

* cited by examiner

TRAIN COMPARTMENT BRAKE CONTROL METHOD, TRAIN COMPARTMENT, AND TRAIN

CROSS-REFERENCE TO RELATED APPLICATIONS

This application is a 35 U.S.C. 371 national stage filing of International Application No. PCT/CN2017/120286 filed Dec. 29, 2017, which claims priority to Chinese Patent Application No. 201711162652.5 filed Nov. 21, 2017. The entire contents of these above patent applications are hereby incorporated by reference in their entirety.

TECHNICAL FIELD

The present disclosure relates to the technology of rail transit, in particular to a brake control method for a train compartment for use in a train with a flexible formation, a train compartment and a train.

BACKGROUND

The current Electrical Multiple Unit (EMU) is mainly of 8-car formation, and runs in a coupled running mode of 8-car formation, 16-car formation and two 8-car formations. However, the current formation mode of the EMU is fixed, that is to say, the position and direction of each car in a whole train are prescriptive when the car is designed, the formation type cannot be changed, and the number of cars included in the train cannot be changed too. Thus, there is an urgent need for designing an EMU that is simple to maintain, adaptable to different transport volume requirements, flexible in formation, and has good business performance.

A brake system is a key technology of a rail transit system, and is one of the important guarantees for the operation of a train having flexible formation.

As illustrated in FIG. 1, the existing brake control policy of fixed train formation adopts a three-layer structure to implement brake management. The first layer is a Brake Control Unit (BCU), the second layer is a Segment Brake Manager (SBM), and the third layer is a Train Brake Manager (TBM). A brake handle of head car generates a brake instruction. The brake instruction is first transmitted on a Wired Train Bus (WTB) network, and then is transmitted to two Multifunction Vehicle Bus (MVB) networks through a Gateway (GW). BCU1.1 of the head car (BCU1.2 is used when the BCU1.1 malfunctions) receives a brake instruction signal on the MVB network, and calculates, according to the received brake signal, a braking force of a unit that the main BCU is in charge of, and sends the calculation result to other BCUs in this segment; then, the other BCUs applies brake according to the received calculation result. Specifically, the BCU on the first layer is mainly in charge of monitoring related devices of the present car and its subsystems, and reporting fault diagnosis information.

The function of the SBM on the second layer is integrated in two BCUs of the head car, and it is the main BCU in the brake control system of the current train formation. As illustrated in FIG. 1, the BCU1.1 and the BCU1.2 are redundant for each other, that is, both the BCU1.1 and the BCU1.2 are equivalent to leaders of this segment, but they cannot perform the function of the SBM at the same time. Another BCU performs the function of the SBM only when one BCU malfunctions. The other BCUs in the brake control system of the current train formation are equivalent to performers, that is, after a brake grade signal is received through the train network, the main BCU is in charge of calculating the braking force in this unit, and sending the calculation result to other BCUs in this segment; then, the other BCUs applies brake according to the received calculation result. The brake grade is a signal of the brake grade sent by the brake handle. The signals which may be sent by the brake handle are: grade 1, grade 2, grade 3, grade 4, grade 5, grade 6, grade 7, and Emergency Brake (EB).

The function of the TBM on the third layer is integrated in the two BCUs, which are redundant for each other, of the head car. Only one of the two BCUs performs the function of the TBM in a service locomotive (a working locomotive coming first in the travel direction of a train), namely the head car. If the TBM malfunctions, the other BCU in the service locomotive automatically performs the function of the TBM. The TBM controls and coordinates all commonly-used brake systems of a train. The main BCU of the head car needs to take charge of the work of both the second layer and the third layer. That is, in the relationship of the second layer, the BCU1.1 and the BCU1.2 in each unit are redundant for each other, and are switched when malfunctioning to perform the function of the SBM; in the relationship of the third layer, the BCU1.1 and the BCU1.2 in each unit are still redundant for each other, and are switched when malfunctioning to perform the function of the TBM.

In the brake control policy of fixed train formation, data like the train formation quantity, the car number of each car, and the type of each car (the type of motor car and trailer car) has been determined in the stage of setting software in the BCU of each car. If a user wants to change the data, the user must change the software in the BCU of each car. If the user wants to change a train having 8 cars into a train having 7 cars, besides the brake units meet the requirement, the user must rewrite and input the software in the BCU of each car, and the new software can be popularized in large scale only after being verified by test. Thus, the brake control policy of fixed train formation cannot be applied to a train of variable formation.

SUMMARY

To solve one of the above technical problems, the present disclosure provides a brake control method for a train compartment. The method includes the following operations.

A number of train compartments of a current train formation is acquired.

A number and type of a current compartment are acquired.

A braking force of the current compartment is calculated based on a train brake instruction and the number of train compartments of the current train formation, and brake control is performed on the current compartment.

Preferably, in the operation of acquiring the number of train compartments of the current train formation, a signal, from which the number of train compartments of the current train formation is acquired, is a periodic persistent signal.

Preferably, the operation of acquiring the number and type of the current compartment comprises that:

a coding sequence set by a compartment encoding device is received;

a number code and a type code are extracted respectively from the coding sequence, and a respective code is identified based on a predefined coding table, and the number and type of the current compartment are acquired.

Preferably, a transmission mode of the coding sequence is binary-form transmission.

Preferably, after the operation of acquiring the number and type of the current compartment comprises that, the method further includes:

the number and type of the current compartment are uploaded to a Train Control and Management System (TCMS) to confirm compartment information.

Preferably, after the operation of acquiring the number and type of the current compartment comprises that, the method further includes:

the current compartment performs information inter-transmission with other compartments in the current train formation through a brake control network, and state information of the current compartment is shared with other compartments in the current train formation through the brake control network.

Preferably, in the operation of performing information inter-transmission with other compartments in the current train formation and sharing the state information of the current compartment with other compartments through the brake control network, the state information comprises one or more of: information about the number of the current compartment, information about the type of the current compartment, information about a brake grade, fault information or diagnosis information.

Preferably, the operation of calculating the braking force of the current compartment based on the train brake instruction and the number of train compartments of the current train formation and performing the brake control on the current compartment includes:

instructions for different brake grades of the train are received, and a corresponding deceleration value is determined according to a predetermined deceleration curve; and the braking force required by the current compartment is calculated according to the deceleration value, the number of train compartments of the current train formation and the type of the current compartment, and the brake control is performed on the current compartment.

A train compartment includes a compartment body. The compartment body is provided with a coding module and BCU.

The coding module is configured to code a number and type of the current compartment.

The BCU is configured to calculate, on the basis of the train brake instruction and a number of train compartments of a current train formation, the braking force of the current compartment, and perform the brake control on the current compartment according to the number and type of the current compartment.

Preferably, the coding module adopts a six-digit encoder. Four output ends of the six-digit encoder are configured to output the sequence number of the current compartment, and other two output ends are configured to output the type number of the compartment.

Preferably, the coding module and the BCU adopt a hard wire to transmit a coding sequence in binary mode.

Preferably, the BCU performs the following operations:

the number of train compartments of the current train formation is received in real time;

a coding sequence set by a compartment encoding device is received; and the number code and the type code are extracted respectively from the coding sequence, the corresponding code is identified based on a predefined coding table, and the number and type of the current compartment are acquired.

Preferably, the BCU further performs the following operations:

the instructions for different brake grades of the train are received, and the corresponding deceleration value is determined according to the predetermined deceleration curve; and the braking force required by the current compartment is calculated according to the deceleration value, the number of train compartments of the current train formation and the type of the current compartment, and the brake control is performed on the current compartment.

To solve one of the above technical problems, the present disclosure further provides a train. The train includes:

a TCMS, which is configured to send the brake instruction and perform information management on the train compartment; and multiple train compartments described above.

Preferably, the TCMS sends, to the BCU, a periodic persistent signal indicating the number of train compartments of the current train formation.

Preferably, each compartment in the current train formation uses different ports to upload the number and type of the compartment to the TCMS for compartment information confirmation.

Preferably, each compartment in the current train formation performs information inter-transmission with other compartments in the current train formation and shares the state information of the current compartment with other compartments in the current train formation through the brake control network.

Preferably, the state information comprises one or more of: the information about the number of the current compartment, the information about the type of the current compartment, the information about the brake grade, the fault information or the diagnosis information.

The present disclosure has beneficial effects as follows.

The technical solution of the present disclosure may use, when a train has any number of train compartments, the number of train compartments acquired in real time to calculate the braking force required by each compartment according to the number and type of the current compartment, and perform the brake control on the train. In this way, the normal operation of brake control may be ensured in the case of flexible formation without being limited to the adjustment of sequences of cars or the adjustment of train formation. In the solution, because there are no master/slave hierarchies between the BCUs of cars, and control grades of the BCUs of cars are the same and redundant for each other, the number of the BCUs used in a single compartment is reduced, which reduces the operation costs.

BRIEF DESCRIPTION OF DRAWINGS

The accompanying drawings described here are used for providing further understanding of the present disclosure, and constitute a part of the present disclosure. Schematic embodiments of the present disclosure and description thereof are used for illustrating the present disclosure and not intended to form an improper limit to the present disclosure. In the accompanying drawings.

DETAILED DESCRIPTION

In order to make the technical solutions and advantages in embodiments of the present disclosure clearer, the exemplary embodiments in the present disclosure are further elaborated below in combination with the accompanying drawings. It is apparent that the described embodiments are only a part of the embodiments of the present disclosure but not all. It is to be noted that the embodiments in the present disclosure and the characteristics in the embodiments may be combined under the condition of no conflicts.

The core concept of the solution is that: when a train formation is flexible, the latest number of train compartments is acquired in real time, a braking force required by each compartment is calculated according to the number and type of each compartment, and brake control is performed on each compartment, so as to prevent the problem that after the number of train compartments is changed, a BCU needs to be changed, replaced and tested, thereby improving the efficiency of flexible formation, ensuring the normal operation of the brake control in the case of flexible formation without being limited to the adjustment of sequences of cars or the adjustment of train compartment formation.

Figure 1:
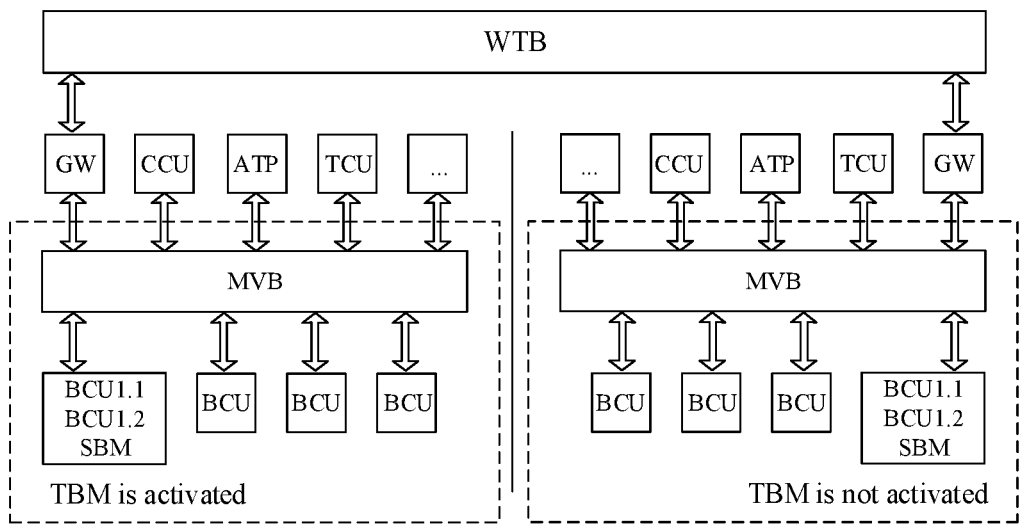
FIG. 1 is a schematic diagram of a brake control policy in the conventional art.
Figure 2:
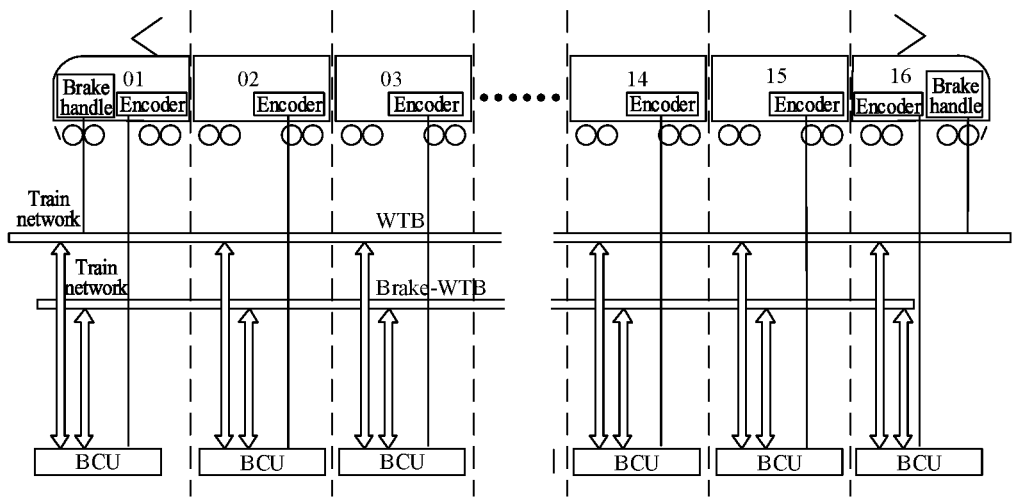
FIG. 2 is a schematic diagram of a brake control policy in the solution.

As illustrated in FIG. 1, the present disclosure provides a brake control method for a train compartment, which is applied to a train having any number of train compartments. The method may form quickly a brake control policy after reforming the train compartments with the change of the number of train compartments. The method includes the following specific steps.

A TCMS sends the number of train compartments of the current train formation to a WTB network through a periodic persistent signal, and a BCU of each train compartment acquires the number of train compartments of the current train formation from the WTB network.

A encoder in the compartment is used to code the compartment, and the BCU uses a hard wire to acquire a coding sequence of the current train formation in binary form. The processing performed on the coding sequence is that according to a predefined coding table, a number code and a type code in the coding sequence are extracted respectively, a corresponding code is identified, and the number and type of the current compartment are acquired.

Each compartment uploads, through the WTB network, the number and type of the current compartment to the TCMS to confirm compartment information, so that the TCMS performs unified control and management on all the compartments in the current train formation.

Each compartment transmits and shares state information with other compartments in the current train formation through a brake control network Brake-WTB. The state information comprises one or more of: information about the number of the current compartment, information about the type of the current compartment, information about the brake grade, fault information or diagnosis information.

The BCU in each compartment sends, on the basis of a train brake handle, a train brake instruction and the number of train compartments of the current train formation to the WTB network, calculates the braking force of the current compartment aiming at the type of the current compartment, and performs the brake control on the current compartment. Specifically, first of all, the train sends instructions for different brake grades to the WTB network according to the different brake grades, and the BCU in each compartment receives the instructions for different brake grades of the train, and determines the corresponding deceleration value according to the predetermined deceleration curve; then, according to the deceleration value, the number of train compartments of the current train formation and the type of the current compartment, the braking force required by the current compartment is calculated, and the brake control is performed on the current compartment.

In the solution, a single braking system is provided in each compartment, which provides pressure through a train pipe running through the whole train; each compartment uses a control value to provide braking air with different pressures to an air brake device according to the needed braking force, so as to complete a brake control policy applied to the single compartment.

As illustrated in FIG. 1, the present disclosure further provides a train compartment, which includes a compartment body. The compartment body is provided with a coding module and a BCU. The coding module is configured to code the sequence and type of the current compartment. The BCU is configured to calculate, on the basis of the train brake instruction and the number of train compartments of the current train formation, the braking force of the current compartment, and perform the brake control on the current compartment according to the number and type of the current compartment.

In the solution, the coding module adopts a six-digit encoder. Four output ends of the six-digit encoder are configured to output the sequence number of the current compartment, and the other two output ends are configured to output the type number of the compartment. The encoder is connected with the BCU through a hard wire, and transmits the coding sequence in binary mode.

In the solution, the BCU performs the following operations: the current number of train compartments of the train is received in real time; the coding sequence set by the compartment encoding device is received; and the number code and the type code in the coding sequence are extracted respectively, and on the basis of the predefined coding table, the corresponding code is identified, and the number and type of the current compartment are acquired. the BCU further performs the following operations: the instructions for different brake grades of the train are received, and the corresponding deceleration value is determined according to the predetermined deceleration curve; and according to the deceleration value, the number of train compartments of the current train formation and the type of the current compartment, the braking force required by the current compartment is calculated, and the brake control is performed on the current compartment.

The present disclosure further provides a train. The train includes: a TCMS, which is configured to send the brake instruction and perform information management on the train compartment; and a plurality of train compartments. Centralized management and control is performed on the whole train having any number of train compartments through the TCMS. The signal of the number of train compartments of the current train formation is sent to the WTB network through the TCMS, and each compartment acquires the number of train compartments of the current train formation from the WTB network. The BCU in each compartment uses different ports to upload the number and type of the compartment to the train control and management system to confirm the compartment information. Each compartment in the current train formation transmits and shares the state information of the current compartment with other compartments in the current train formation through the brake control network Brake-WTB.

The solution is further described through a group of examples.

An embodiment provides a brake control policy applied to a train having any number of train compartments. The policy includes several parts as follows: the BCU may learn the latest number of train compartments; the BCU may learn the number and type of compartment where it is; and the BCU in each compartment may share the state information with other compartments, and they are redundant for each other. Specifically, as illustrated in FIG. 1, in the present embodiment, a hierarchical structure managed by the braking system adopts a single-layer structure to realize brake management, that is, a brake control unit in a single compartment may independently complete a braking operation of the compartment. There are no priorities among the BCUs of the cars, and the BCU in each compartment is equivalent to a main BCU. Each BCU is not limited to other BCUs when performing the brake control like brake commanding and fault diagnosis.

As illustrated in FIG. 1, the network structure in the present embodiment is a system having the independent brake control network (Brake-WTB), and the transmission and sharing of the state information of the BCU in each compartment may be completed through the brake control network.

In the present embodiment, all the BCUs of each compartment may learn the latest number of train compartments through WTB network. Specifically, a mechanic inputs manually an actual number of train compartments to a specified position of parameter on an HMI display screen in the cab, that is, the mechanic inputs the parameter to the TCMS. The operation is generally performed when initial parameters of the train are set and after the train formation changes. The TCMS sends, through the network, a network signal of the number of the train compartments to each BCU. The network signal is a persistent signal sent periodically. In such a manner, the BCU of each compartment may receive the actual number of train compartments of the train in real time, and then may perform braking calculation according to the actual number of train compartments of the train.

In the present embodiment, the BCU in each compartment may learn the car number of the compartment where it is. There is a single-car car encoding device provided in each compartment. The device is mainly used to number the car. In the present embodiment, the car encoding device adopts a six-digit encoder. Four output ends of the six-digit encoder are configured to output the sequence number of the current compartment, and the other two output ends are configured to output the type number of the compartment. The coding sequence is transferred, through six hard wire signals, to the BCU in the compartment in binary form, and after the BCU of each compartment receives the information, the information is transmitted between the BCUs through the brake control network (Brake-WTB); in such a manner, after other BCUs receive and read the information, the numbers and types of the cars, where the other BCUs are, may be confirmed.

The definition of the car codes is:

| B0 | B1 | B2 | B3 | Number of car |
|---|---|---|---|---|
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 10 |
| 1 | 0 | 1 | 1 | 11 |

-continued

| B0 | B1 | B2 | B3 | Number of car |
|---|---|---|---|---|
| 1 | 1 | 0 | 0 | 12 |
| 1 | 1 | 0 | 1 | 13 |
| 1 | 1 | 1 | 0 | 14 |
| 1 | 1 | 1 | 1 | 15 |
| 0 | 0 | 0 | 0 | 16 |

There are two types of compartments, namely a motor car or a trailer car. When a code output of the motor car is 01, the code output of the trailer car is 10. The code outputs represent the current types of compartments.

In the present embodiment, the cars, to which the information transmitted between the BCUs belongs, are differentiated through different network segments and ports used by the BCU in each compartment to upload the information to the brake control network (Brake-WTB). For example, the network segment used by the BCU in the compartment 1 to upload the information to the brake control network (Brake-WTB) is the network segment 1, and the port used is 710. The network segment used by the BCU in the compartment 2 to upload the information to the brake control network (Brake-WTB) is the network segment 2, and the port used is 710, too, and so on. When receiving the information from the network segment 1 and the port 710, the BCU of other compartment may read automatically that the information is from the compartment 1. In this way, the BCU of each compartment may confirm which BCU sends the received information. Each BCU transmits the car number of the current car, car attribute, received information about the brake grade, the fault information and the diagnosis information in the brake control network (Brake-WTB) over and over again; and at the same time, each BCU acquires the state information of the BCUs in other compartments, and implements sharing and confirmation of the state information of each compartment.

In the present embodiment, the cars, to which the information transmitted between the BCU and the TCMS belongs, are confirmed through the different network segments and ports used to send the information to the TCMS. For example, the network segment used by the BCU in the compartment 1 to send the information to the TCMS is the network segment 1, and the port used is 610. The network segment used by the BCU in the compartment 2 to send the information to the TCMS is the network segment 2, and the port used is 610, too; and so on. When the receiving the information from the network segment 1 and the port 610, the TCMS may read automatically that the information is from the compartment 1. Similarly, when sending the information to the BCU, the TCMS specifies which network segment and which port the information is sent to. Only one network segment and one port may be specified to send the information; or a plurality of network segments and a plurality of ports may be specified to send the information; that is, the TCMS may send the signal to either the BCU of a certain compartment or the BCUs of all the compartments.

When the train brakes, a brake grade signal is sent to the BCU of each compartment through the WTB network; after receiving a brake grade command, the BCU of each compartment takes the whole train as a unit to perform braking force distribution calculation, and transmits the calculation result between the BCUs through the brake network. At the same time, the BCU of each compartment performs independently the brake control on this compartment according to the set brake deceleration curve. The brake control performed by the BCU of a compartment does not interfere with the brake control performed by the BCUs of other compartments.

For example, the train having 12 train compartments is changed into a train having 8 train compartments, and 6 motor cars and 6 trailer cars are reduced to 5 motor cars and 3 trailer cars. The BCU of each compartment may learn through the WTB network that the train having 12 train compartments has been changed into the train having 8 train compartments, and transmits, through the brake control network Brake-WTB, the number and the type of the car among the BCUs in all the compartments. In such a manner, each BCU may know how many train compartments now the train has, and how many motor cars and trailer cars the formation has, which one is the motor car, and which one is the trail car. When the whole train performs brake calculation, the BCU of each car automatically calculates how much braking force should be applied by the present car of the train having 8 train compartments.

By means of a brake control and management policy mentioned above, it may be realized that no matter how the number of train compartments of the train changes, the BCU in each compartment may perform independently calculation and distribution of the braking force according to the actual train formation form. This control mode meets a requirement for variable formation of EMU.

In the solution, the calculation and distribution of the braking force performed by the BCU is that: the brake of EMU is actually that the brake system applies brake according to the set deceleration curve; and the different brake grades and different speed grades correspond to the different deceleration values. The calculation and distribution of the braking force performed by the BCU aims to calculate and distribute how much braking force should be applied by each car to meet the requirement for deceleration of the whole train.

For the information required by calculating the braking force, basic brakes of the motor car and the trailer car are different. Generally, the basic brake of the motor car is a wheel brake, and the basic brake of the trailer car is an axle brake. The braking forces applied by the wheel brake and the axle brake are different. So, when the braking force required by a single car is calculated, it is necessary to know whether the present car is the motor car or the trailer car, and the number of the motor cars and trailer cars of the EMU. The braking force may be calculated according to a conventional calculation formula of the braking force of the motor car or the trailer car.

By means of the technical solution of the embodiment, the brake control of the train having any number of train compartments may be realized; when the train formation is changed, there is no need to rewrite, input, replace or test software of the BCU in the compartment, thereby reducing the maintenance costs, and saving the time for train formation.

It is apparent that those skilled in the art may make various modifications and changes to the present disclosure without departing from departing from its spirit and scope. If these modifications and variations of the present disclosure belong to the scope of the claims of the present disclosure and its equivalent technology, the present disclosure is intended to include these modifications and variations.

The invention claimed is:

1. A brake control method for a train compartment, the method comprising operations of:
   acquiring a number of train compartments of a current train formation;
   acquiring a number and type of a current compartment; and
   calculating a braking force of the current compartment based on a train brake instruction and the number of train compartments of the current train formation, and performing brake control on the current compartment,
   wherein the operation of acquiring the number and type of the current compartment comprises:
   receiving a coding sequence set by a compartment encoding device; and
   extracting respectively a number code and a type code from the coding sequence, and identifying a respective code based on a predefined coding table, and acquiring the number and type of the current compartment,
   wherein the compartment encoding device adopts a six-digit encoder, four output ends of which are configured to output a sequence number of the current compartment, and other two output ends are configured to output a type number of the compartment.

2. The brake control method of claim 1, wherein in the operation of acquiring the number of train compartments of the current train formation, a signal, from which the number of train compartments of the current train formation is acquired, is a periodic persistent signal.

3. The brake control method of claim 1, wherein a transmission mode of the coding sequence is binary-form transmission.

4. The brake control method of claim 1, wherein after the operation of acquiring the number and type of the current compartment, the method further comprises:
   uploading the number and type of the current compartment to a train control and management system for compartment information confirmation.

5. The brake control method of claim 1, wherein after the operation of acquiring the number and type of the current compartment, the method further comprises:
   performing information inter-transmission with other compartments in the current train formation and sharing state information of the current compartment with other compartments in the current train formation through a brake control network.

6. The brake control method of claim 5, wherein in the operation of performing information inter-transmission with other compartments in the current train formation and sharing the state information of the current compartment with other compartments through the brake control network, the state information comprises one or more of: information about the number of the current compartment, information about the type of the current compartment, information about a brake grade, fault information or diagnosis information.

7. The brake control method of claim 1, wherein the operation of calculating the braking force of the current compartment based on the train brake instruction and the number of train compartments of the current train formation and performing the brake control on the current compartment comprises:
   receiving instructions for different brake grades of the train, and determining a corresponding deceleration value according to a predetermined deceleration curve; and
   calculating the braking force required by the current compartment according to the deceleration value, the number of train compartments of the current train formation and the type of the current compartment, and performing the brake control on the current compartment.

8. A train compartment, comprising a compartment body, wherein the compartment body is provided with:
 a coding module configured to code a number and type of the current compartment;
 a brake control unit configured to calculate, on the basis of a train brake instruction and a number of train compartments of a current train formation, a braking force of the current compartment, and perform brake control on the current compartment according to the number and type of the current compartment,
 wherein the coding module adopts a six-digit encoder, four output ends of which are configured to output a sequence number of the current compartment, and other two output ends are configured to output a type number of the compartment.

9. The train compartment of claim 8, wherein the coding module and the brake control unit adopt a hard wire to transmit a coding sequence in binary mode.

10. The train compartment of claim 8, wherein the brake control unit is configured to perform operations of:
 receiving the number of train compartments of the current train formation in real time;
 receiving a coding sequence set by a compartment encoding device;
 extracting respectively a number code and a type code from the coding sequence, identifying corresponding respective code based on a predefined coding table, and acquiring the number and type of the current compartment.

11. The train compartment of claim 10, wherein the brake control unit is further configured to perform operations of:
 receiving instructions for different brake grades of the train, and determining a corresponding deceleration value according to a predetermined deceleration curve; and
 calculating the braking force required by the current compartment according to the deceleration value, the number of train compartments of the current train formation and the type of the current compartment, and performing the brake control on the current compartment.

12. A train, comprising:
 a train control and management system, configured to send a brake instruction and perform information management on a train compartment;
 a plurality of train compartments each comprising a compartment body, wherein the compartment body is provided with:
 a coding module configured to code a number and type of the current compartment;
 a brake control unit configured to calculate, on the basis of a train brake instruction and a number of train compartments of a current train formation, a braking force of the current compartment, and perform brake control on the current compartment according to the number and type of the current compartment,
 wherein the coding module adopts a six-digit encoder, four output ends of which are configured to output a sequence number of the current compartment, and other two output ends are configured to output a type number of the compartment.

13. The train of claim 12, wherein the train control and management system sends, to a brake control unit, a periodic persistent signal indicating the number of train compartments of the current train formation.

14. The train of claim 12, wherein each compartment in the current train formation uses different ports to upload the number and type of the compartment to the train control and management system for compartment information confirmation.

15. The train of claim 12, wherein each compartment in the current train formation performs information inter-transmission with other compartments in the current train formation and shares state information of the compartment with other compartments in the current train formation through a brake control network.

16. The train of claim 15, wherein the state information comprises one or more of: information about the number of the current compartment, information about the type of the current compartment, information about a brake grade, fault information or diagnosis information.

17. The train of claim 12, wherein the coding module and the brake control unit adopt a hard wire to transmit a coding sequence in binary mode.

* * * * *